(12) United States Patent
Tisseur et al.

(10) Patent No.: US 12,316,803 B2
(45) Date of Patent: May 27, 2025

(54) AUTOMATED SYSTEM FOR DETECTING PHONE DISTRACTION EVENTS AND METHOD THEREOF

(71) Applicant: Swiss Reinsurance Company Ltd., Zurich (CH)

(72) Inventors: Riccardo Tisseur, Aramengo (IT); Matteo Maffetti, Trento (IT)

(73) Assignee: Swiss Reinsurance Company Ltd., Zurich (CH)

( * ) Notice: Subject to any disclaimer, the term of this patent is extended or adjusted under 35 U.S.C. 154(b) by 375 days.

(21) Appl. No.: 17/807,950

(22) Filed: Jun. 21, 2022

(65) Prior Publication Data

US 2022/0337698 A1 Oct. 20, 2022

Related U.S. Application Data

(63) Continuation of application No. PCT/EP2021/074336, filed on Sep. 3, 2021.

(30) Foreign Application Priority Data

Mar. 29, 2021 (CH) .......................... 328/21

(51) Int. Cl.
*H04M 1/72454* (2021.01)
*B60W 40/08* (2012.01)
(52) U.S. Cl.
CPC ........ *H04M 1/72454* (2021.01); *B60W 40/08* (2013.01); *B60W 2540/229* (2020.02)
(58) Field of Classification Search
CPC ............. H04M 1/72454; B60W 40/08; B60W 2540/229; H04L 67/12
See application file for complete search history.

(56) References Cited

U.S. PATENT DOCUMENTS 10,672,249 B1 * 6/2020 Balakrishnan ......... G08B 21/18

FOREIGN PATENT DOCUMENTS

CN 103843314 A * 6/2014 ............. G01P 13/00

* cited by examiner

*Primary Examiner* — Said M Elnoubi
(74) *Attorney, Agent, or Firm* — Oblon, McClelland, Maier & Neustadt, L.L.P.

(57) ABSTRACT

An automated system, phone distraction detector and method for automatically detecting phone distraction events in a moving vehicle, caused by a driver of the moving vehicle by using a smartphone. An Internet of Things (IoT) server is communicatively coupled to the smartphone. The smartphone (comprises one or more sensors built into the smartphone, wherein sensory data of the one or more sensors, are captured by the sensors of the smartphone during a vehicle trip and are transmitted to the Internet of Things (IoT) server, and wherein the sensor data comprises one or more chunks of data streams associated with an IoT service from the smartphone. The sensory data are processed and analyzed by the server to identify one or more phone handling events associated with the smartphone during the vehicle trip. One or more phone handling events associated with the smartphone are aggregated into one or more macro events by the processing means of the server. The aggregated one or more macro events are processes by the server based on a set of preconfigured rules to determine a phone distraction event, wherein the set of preconfigured rules are based on predefined thresholds to determine the phone distraction event.

11 Claims, 9 Drawing Sheets

AUTOMATED SYSTEM FOR DETECTING PHONE DISTRACTION EVENTS AND METHOD THEREOF

CROSS REFERENCE TO RELATED APPLICATIONS

The present application is a continuation of International Application No. PCT/EP2021/074336, filed Sep. 3, 2021, which is based upon and claims the benefit of priority to Swiss Application No. 00328/21, filed Mar. 29, 2021. The entire contents of all of the above applications are incorporated herein by reference.

FIELD OF THE INVENTION

The present invention relates to systems, electronic devices, and methods for automated detection of phone distraction events. In particular, the systems and methods relate to systems and methods for detecting mobile phone distraction events in moving automobiles or motor vehicles.

BACKGROUND OF THE INVENTION

Distracted driving is considered to be one of main causes for road traffic injuries. Smartphone usage has been identified as a primary source of driver distraction, as the smartphone takes the driver's attention off the road, making vehicle occupants, such as drivers and passengers, vulnerable to road crashes. Despite knowing the risk of using smartphones while driving, many drivers tend to use smartphones during driving, for example, for making calls, text messaging, playing media, web browsing, social media browsing, gaming, and for other purposes. Various systems have been developed in recent years in order to limit the use of smartphones during driving. However, the conventional systems disable the smartphone partially or completely.

In general, the technical ability of determining, monitoring, and reporting mobile phone distraction of a driver is useful because, among other reasons as mentioned above, driver mobile phone distraction poses a significant crash and accident risk, i.e. the measured probability that a driver becomes involved in an occurring car accident. In the prior art systems, various safe-driving mobile applications are known using sensor data from personal mobile devices (e.g., smartphones), in some cases augmented with sensor data from an optional device attached to a vehicle, which are used to measure the quality of driving of drivers with the goal of improving their driving to make roads safer. The sensors available on a mobile phone that are useful in achieving this goal include, but are not limited to, position sensors (e.g., the Global Positioning System, GPS), a three-axis accelerometer to measure the phone's acceleration along three orthogonal axes, and a three-axis gyroscope to measure the phone's angular velocity along the three axes.

The term "mobile device" is used herein to include, for example, any kind of equipment that can be carried by a user without requiring wired connection to a communication link and is subject to being used, while a user is driving, in a way that can cause distraction of the user from the driving. Mobile devices include mobile phones or smart phones, for example.

In the existing systems, users can install a mobile application (app) on the mobile phone and drive with it. The app runs in the background, automatically detecting the start and stop of each trip using information from location and mobile phone activity APIs provided by the iOS and Android operating systems, in some cases augmented with information from the inertial sensors on the phone; or, using wireless signals from an in-vehicle device such as the tag device from mobile telematics (e.g. described in US20150312655A1). Such mobile app typically gathers sensor data from the movement sensors, including position sensors, accelerometer, and gyroscope when the user (of the phone) is driving. These sensor data are typically analyzed and initially processed on the mobile phone, then sent to a server via a wireless network (e.g., Wi-Fi, cellular, or any other network providing connectivity to the servers). At the server, a telematics engine processes the stream of sensor data from the mobile device to accurately estimate both the dynamics of the vehicle and the movement patterns of the mobile phone within the vehicle. These computations could also be run on the mobile device itself without the data being sent to a server.

The estimated vehicle dynamics can e.g. include map-matched positions (latitude/longitude/altitude). The estimated vehicle dynamics can also include the "longitudinal" (in the direction of the vehicle, i.e., the forward acceleration and braking) and "lateral" acceleration (e.g., cornering) of the vehicle. For braking, acceleration, and cornering, the system uses the accelerometer and gyroscope data from the phone-which measures the force the phone is experiencing along three orthogonal axes, typically two axes parallel to the surface (e.g., the surface of the display screen) of the phone and one axis perpendicular to the surface of the mobile phone and transforms these signals into an estimate of the acceleration of the vehicle, while ensuring that the movement of the phone relative to the vehicle itself does not contribute. This process includes estimating and segmenting periods of time when the phone is moving in a reference frame independent of the vehicle, e.g., because the orientation of the phone was changed by the user. As discussed later, the process by which this segmentation of a trip into distinct periods when the phone was being significantly moved within the vehicle is important for the assessment of phone distraction.

It is also known that the server can generate scores for aspects of the user's driving, taking into account factors such as patterns of hard braking, at-risk speeding, harsh acceleration, harsh cornering, amount of driving, time of driving, and the users phone distraction. In some prior art systems, the server also can provide an overall score (typically over a rolling time window, such as over one day, two weeks, one month, three months, one year, etc.) and features to engage users and incentivize safer driving, such as personalized driving tips, a leaderboard where users can compare their scores (to their families, friends, neighbors, co-workers, town, state, etc.), and cash prizes for safe driving. A key aspect of the scoring is an assessment of phone distraction.

The server can also apply several classifiers to the sensor data captured from the mobile device. One such classifier produces a probability or likelihood estimate as to whether the sensor data represents data from a car or some other vehicle, such as bus, train, bike, etc. Another classifier estimates, for car trips, whether the user of the device was a passenger or driver, based on both the sensor data as well as other contextual information, such as the start and end locations of the trip.

A "phone movement" or "phone distraction" classifier determines the locations and times during which a user was using her phone during a trip. Typically, the location information about distraction events are provided as a time-stamped sequence of road segments, or more generally, as temporal defined latitude/longitude position tuples together with polylines connecting the start and end positions by way of zero or more intermediate positions (also called "waypoints"). In various versions of the prior art systems, this feature has been termed "phone movement", "phone motion", "phone use", "phone distraction", or "distraction". Various existing systems build on an approach, in which the sensor data obtained from the trip is segmented to demarcate periods during which the phone was deemed to have moved relative to the frame of reference of the vehicle (e.g., it was moved either by a user or for other reasons within a vehicle). This procedure involves the use of accelerometer and/or gyroscope data; when the dynamics of these sensors is above various thresholds, the phone is considered to have "moved".

The movement of a phone does not by itself constitute "distraction"; it is, however, a factor indicative of distraction, i.e. a necessary but not sufficient condition. To classify whether a particular set of segments of a trip with phone movement indicates distraction, the existing method augments the inference of phone movement with two further factors: (i) was the user likely to be interacting with the device when the phone movement occurred, and (ii) was the vehicle moving at the time of the phone movement. A specific indicator of whether the user was interacting with the phone uses the phone's screen state ("on" signifies interaction) and/or the phone's phone-lock state. With respect to vehicle movement, some prior art systems consider a threshold vehicle speed below which the distraction is not considered to be occurring (e.g., a user may have pulled over and be looking at their phone or driving slowly).

Typically, three conditions must all hold true for a distraction to be considered to contribute to a measured value of increased risk, i.e. increased probability of the occurrence of a car accident:

(i) Phone movement as inferred from gyroscope and/or accelerometer data.
(ii) User interacting with phone, inferred particularly from phone-screen state and phone-lock state.
(iii) The vehicle speed during the segment exceeding a threshold; various statistics of the speed over the duration of the distraction can be used, including the mean, median, or maximum.

In some prior art systems, the user is able to view on a mobile app's trip interface a scored phone distraction measure, e.g. as an overlay on a map with the road segments shown in a different color or shade from the rest of the trajectory, and including some additional information (e.g., duration of distraction, speed of vehicle). In addition, by aggregating all distraction periods for a trip, each trip is given a phone distraction score (typically on a scale of 1 to 5 or 1 to 10). An aggregate distraction score is also often generated over a rolling period of time (e.g., past two weeks of driving, or any time period).

The prior art systems therefore typically are based on a concept of temporal periods and severity metrics, logging of periods of phone motion, in particular: duration of phone motion, speed of vehicle, and road type where the distraction occurred. The existing systems typically rely on acceleration, gyro readings, and screen state of the mobile device, as well as acceleration from an external device to detect phone motion. Sensor readings indicating movement of the mobile device must collectively last at least a minimum duration to log a phone motion period; and movements detected within a set time interval of each other are incorporated into the same period. These episodes are assessed individually to assign a risk to the event, which is reported to users. The episodes are also assessed collectively in generating a distraction score to display to a user: the distraction scores are assessed per driving trip and per calendar period.

SUMMARY OF THE INVENTION

It is one object of the present invention to provide an automated system and method for robust and reliable detection of phone distraction events. In particular, it is an object of the present invention to provide an automated system and method for robust and reliable detection of phone distraction events in moving automobiles and/or motor vehicles and/or unmotorized transport vehicles. However, it is a general object of the present invention to provide a mobile automotive systems reacting, in real-time, dynamically on captured environmental or operational parameters during operation of a motor vehicles, in particular on measuring parameters of mobile phones or smart phones. In particular, it is an object of the invention to provide an automotive system for detecting and/or automatically classify phone distraction events that might occur during a car trip. The inventive system should be based on merely using signals and information typically available in modern smartphones.

According to the present invention, these objects are achieved, particularly, with the features of the independent claims. In addition, further advantageous embodiments can be derived from the dependent claims and the related descriptions.

According to the present invention, the above-mentioned objects for a system, electronic device and/or method for automated detection of phone distraction events are achieved in that the system 100 includes a mobile phone 102, such as a smartphone, of a driver of a moving vehicle 202, such as an automobile, ship, plane, motorcycle, electro bikes or other motor or unmotorized vehicles as bicycles, skis or the like, and an Internet of Things (IoT) server 104 communicatively coupled to the smartphone 102. In an embodiment variant, the IoT server 104 receives, during a vehicle trip, sensor data captured by the mobile phone 102, as the smartphone, using one or more sensors 118, 120 built into the smartphone 102, wherein the sensor data comprises one or more chunks of data streams associated with an IoT service from the smartphone 102, The sensor data are analyzed by the system to identify one or more phone handling events associated with the smartphone 102 during the vehicle trip 202, the one or more phone handling events associated with the smartphone 102 being aggregated into one or more macro events, and the aggregated one or more macro events are processed based on a set of preconfigured rules to detect possible phone distraction events. The set of preconfigured rules are based on predefined thresholds to determine the phone distraction events.

In an embodiment variant, the above-mentioned objects for an automotive method and system for an intelligent, automotive system are achieved by receiving signals from one or more detectors housed in a mobile device while the mobile device is on a trip, the detectors comprising at least an accelerometer and a gyroscope, using the received signals from the detectors to identify one or more physical states of the mobile device during the trip, the physical states comprising speed of motion of the mobile device along a trajectory of the trip, and operational state of the mobile device, based on the identified physical states, generating discrete events separated in time, at least one of the discrete events comprising the mobile device being picked up, rotated, held by, tapped on, or facing in the direction of a driver, and determining a temporal distraction period that spans at least one of the events during the trip, the determining of the distraction episode comprising providing a measured distraction score associated with the distraction period.

In another or supplement embodiment variant, a method for communication between a plurality of participants includes the step of receiving, by an IoT server 104, sensory data measured and captured by sensors of a smartphone 102 located in the moving vehicle 202 or motor vehicle using one or more sensors 118, 120 built into the smartphone 102 during the vehicle trip, wherein the sensor data comprises one or more chunks of data streams associated with an IoT service from the smartphone 102, the step of analyzing, by the IoT server 104, the sensor data to detect and/or identify one or more phone handling events associated with the smartphone 102 during the vehicle trip 202, aggregating, by the IoT server 104, the one or more phone handling events associated with the smartphone 102 into one or more macro events, and the step of processing, by the IoT server 104, the aggregated one or more macro events based on a set of preconfigured rules to detect possible phone distraction events. The set of preconfigured rules are based on predefined thresholds to determine the phone distraction event.

BRIEF DESCRIPTION OF THE DRAWINGS

The present invention will be explained in more detail below relying on examples and with reference to these drawings in which:

FIG. 2 shows another block diagram schematically illustrating an exemplary first approach designed to detect phone handlings, starts by computing the norm of the acceleration signal:

$$a(t) = \sqrt{(a_x(t)^2 + a_y(t)^2 + a_z(t)^2)}$$

where $a_x(t)$, $a_y(t)$, $a_z(t)$ represent respectively the x,y,z components of the acceleration sensed by the phone.

Figure 4:
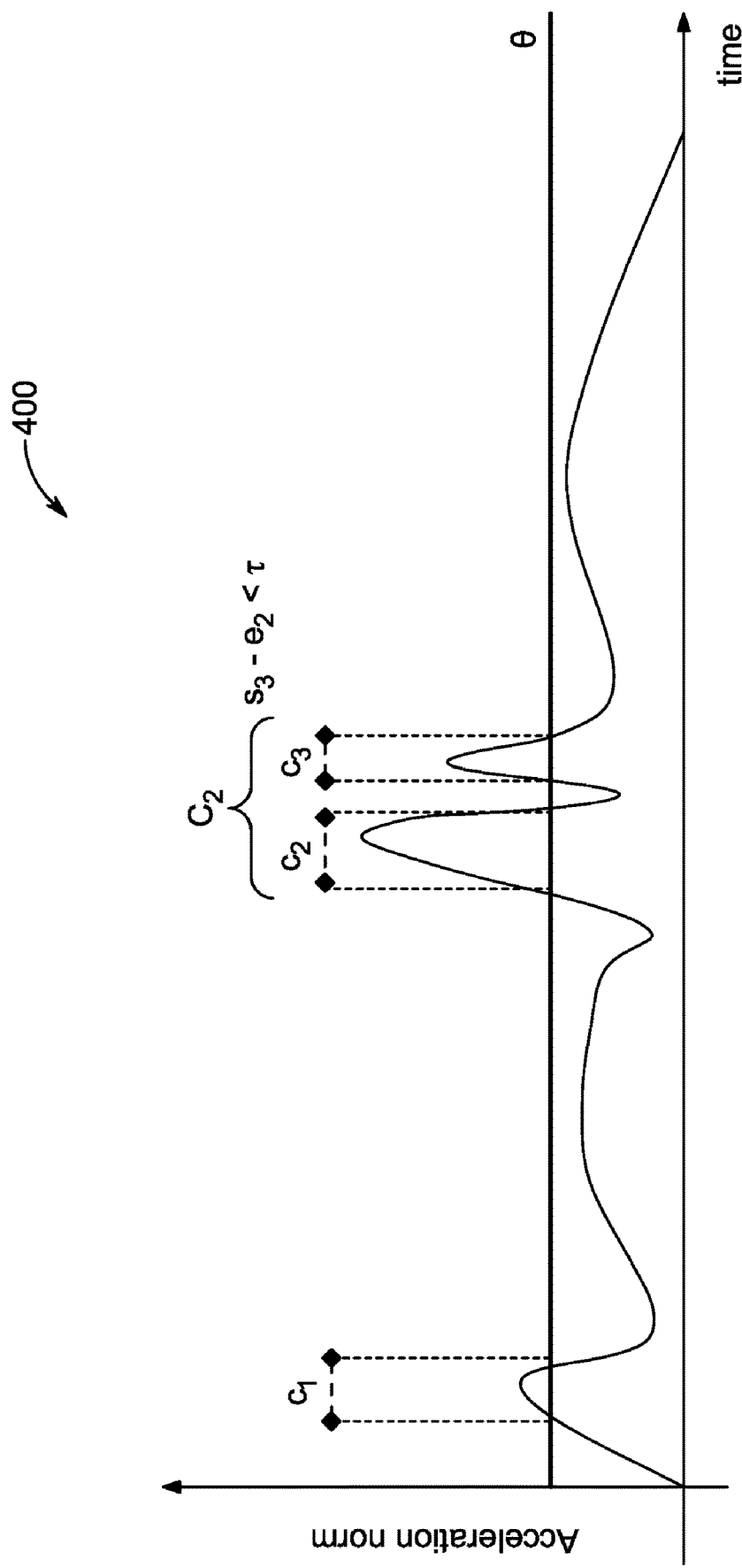

FIG. 4 shows a block diagram, schematically illustrating an exemplary acceleration norm signal that is filtered to generate a plurality of device movement candidates. The filtered norm of the acceleration signal used to generate initial candidates is merged together based on the time distance that separates each consecutive couple.

Figure 5:
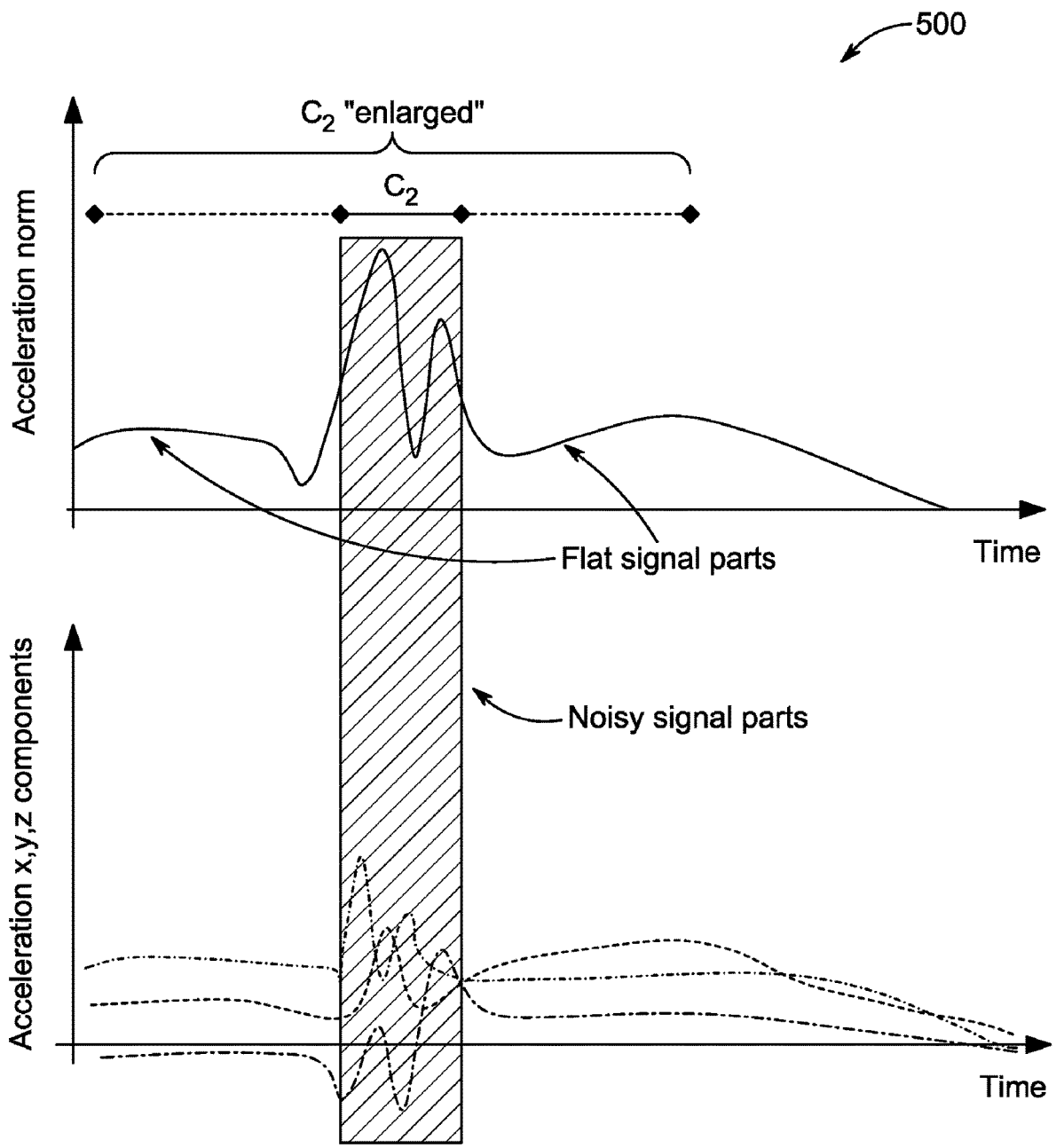

FIG. 5 shows a diagram, schematically illustrating an exemplary noisy signal part and a flat signal part of an enlarged device movement candidate. Before evaluating dispersion index feature, noisy parts of the accelerations are excluded by measuring the discrete derivative of the acceleration norm.

Figure 6:
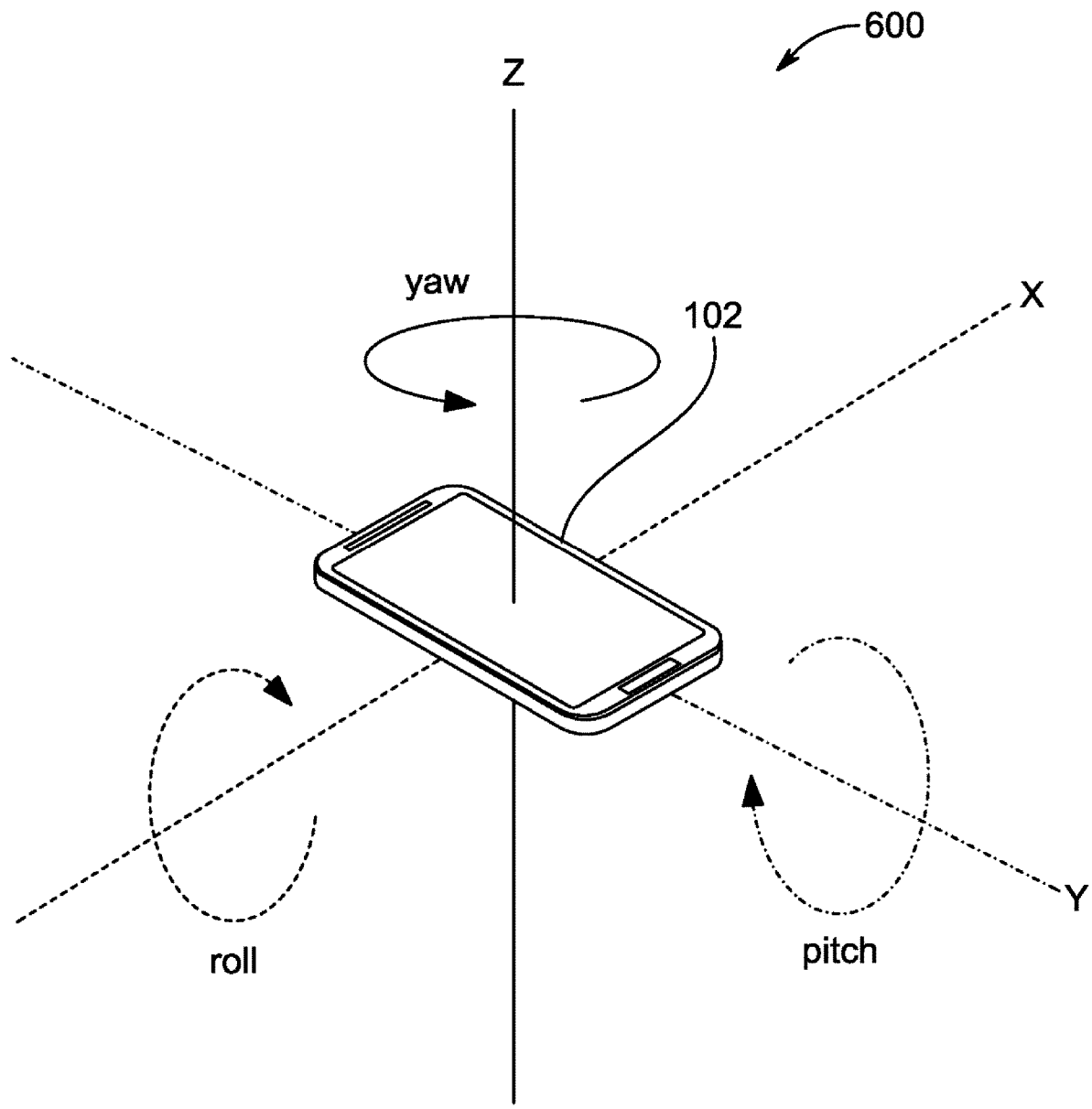

FIG. 6 shows a diagram, schematically illustrating an exemplary roll angle, a pitch angle, and a yaw angle with reference to the smartphone and/or mobile phone 102. Thus, FIG. 6 shows a diagram schematically illustrating an exemplary second embodiment variant disclosing an approach introduced to characterize the orientation of the phone in terms of pitch and roll angles. Pitch, roll and yaw angles are used to describe the rotation of a rigid body (x, y, z) with respect to a given reference frame.

Figure 7:
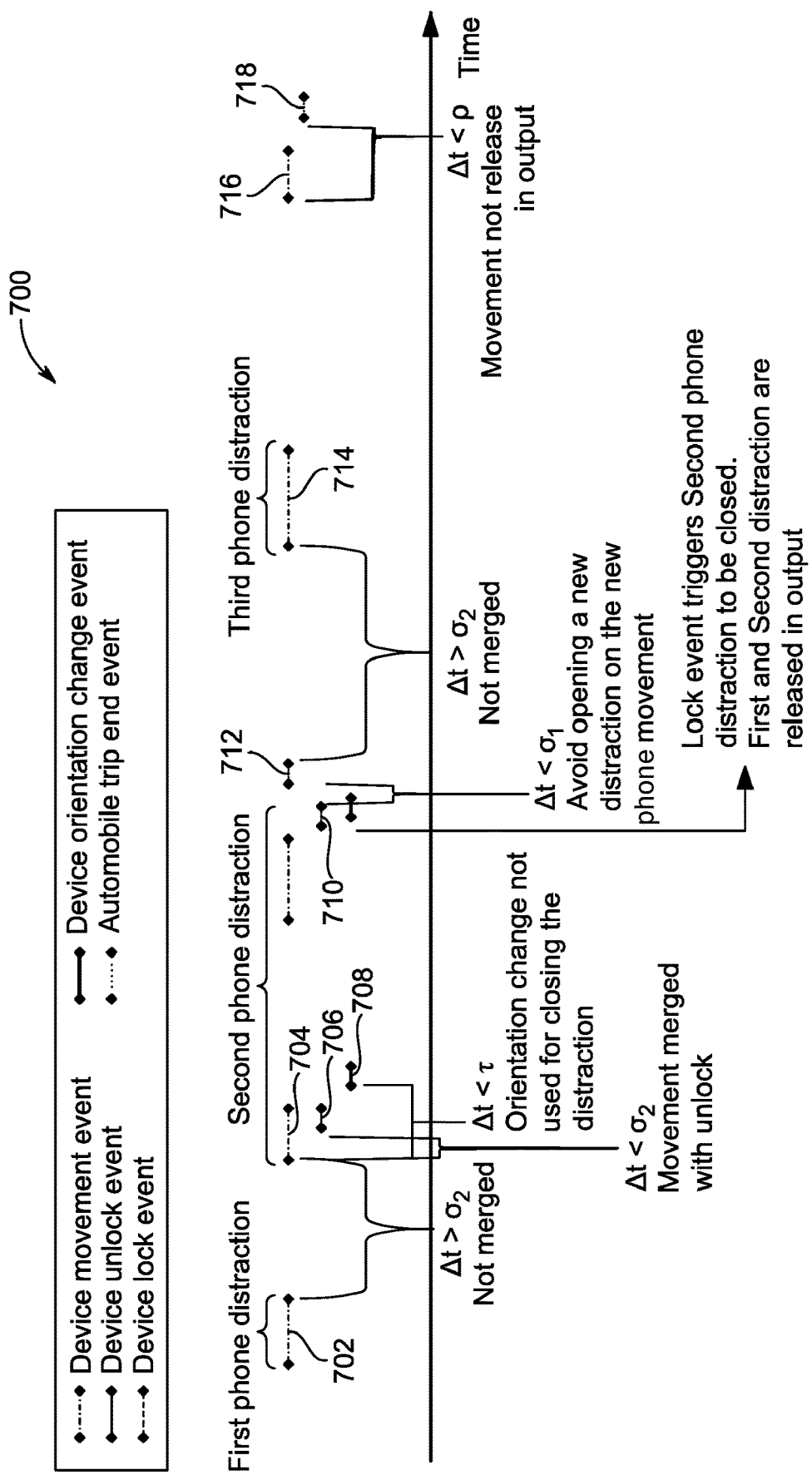

FIG. 7 shows a diagram, schematically illustrating an exemplary generation of phone distractions based on one or more discrete events associated with the smartphone and/or mobile phone 102.

Figure 8:
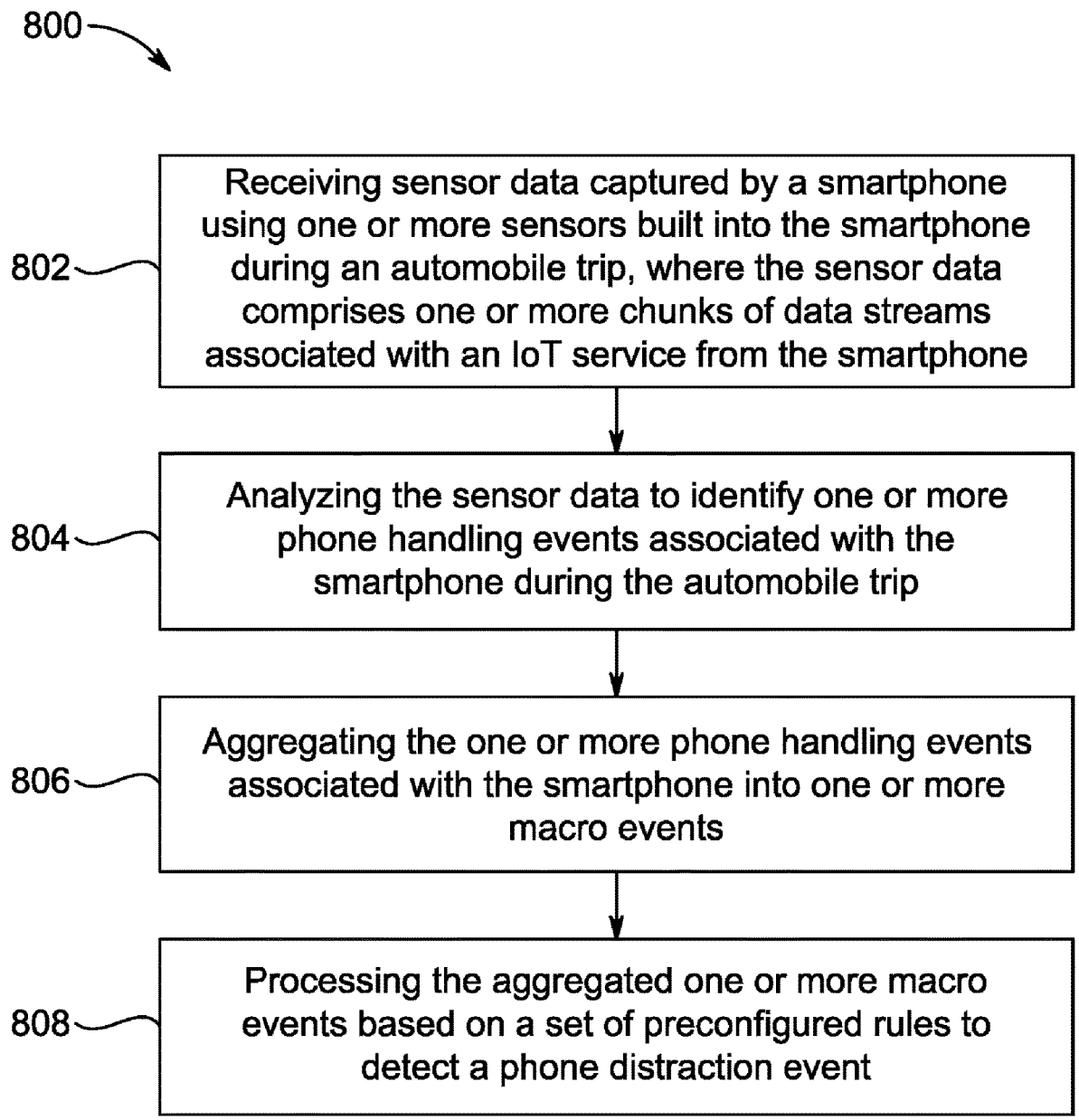
Figure 9:
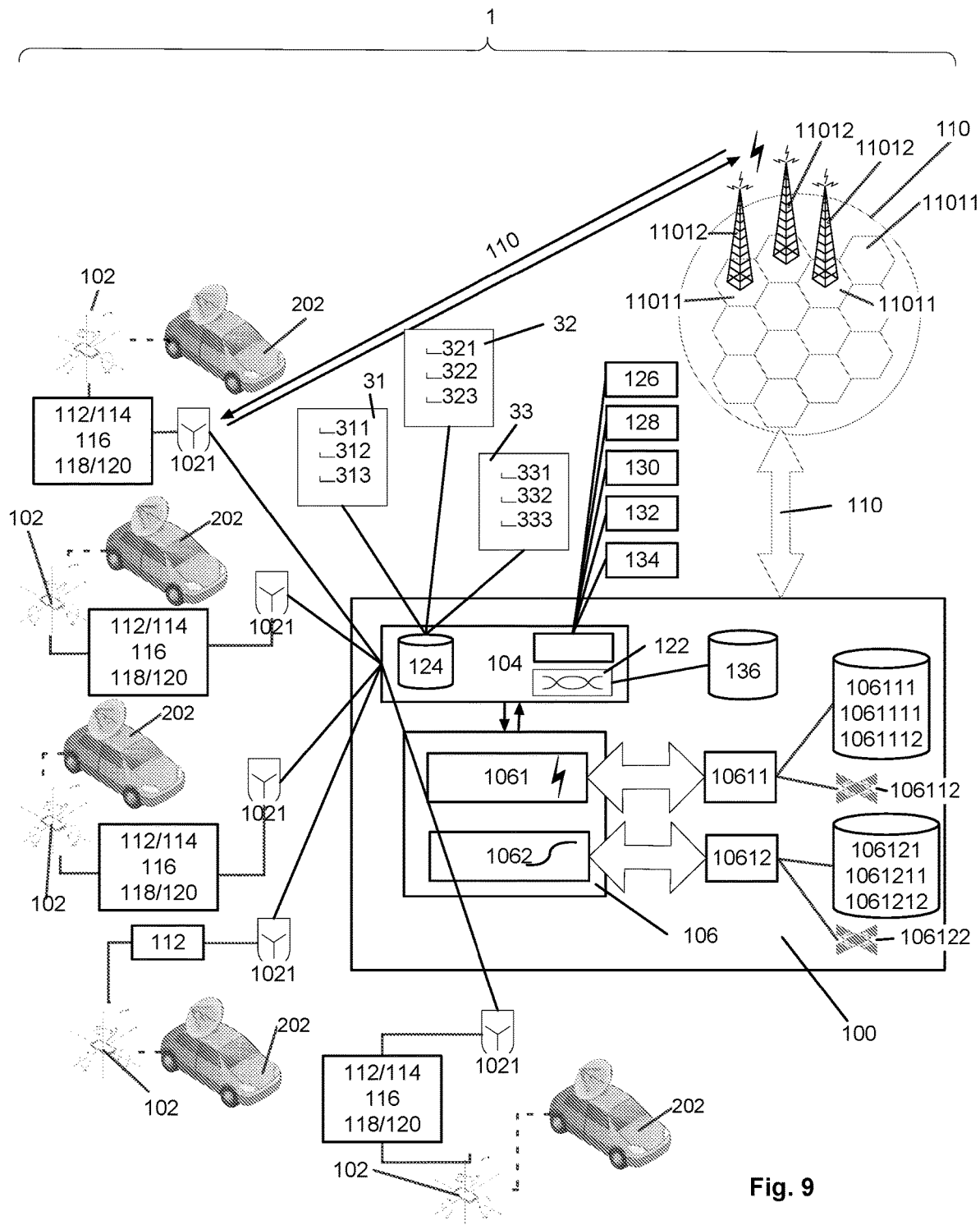

FIG. 8 shows a flow diagram, schematically illustrating an exemplary detection of phone distraction events in moving automobiles and/or motor vehicles 202, FIG. 9 shows a block diagram schematically illustrating an exemplary telematics-based system 1 for event measurements associated with possible distractions by using a mobile phone during the operation of a motor vehicle 202 or transportation means of passengers or goods. The mobile phones 102 comprise sensors and/or measuring devices 118/120, and the mobile phones 102 capture usage-based 31 and/or user-based 32 and/or operational 33 telematics data during operation of the motor vehicle 202. The captured usage-based 31 and/or user-based 32 and/or operational 33 telematics data can e.g. comprise time series of sensory data 311/312/313, 321/322/323, 331/332/333 of the measured usage-based 31 and/or user-based 32 and/or operational 33 sensory and/or telematics data.

DETAILED DESCRIPTION OF THE PREFERRED EMBODIMENTS

FIGS. 1 to 5 schematically illustrate an architecture for a system 100 for detecting phone distraction events in moving automobiles and/or motor vehicles 202.

According to an embodiment, the system 100 may include a mobile phone 102, such as a smartphone, an Internet of Things (IoT) server/cloud infrastructure 104 (hereinafter referred to as the IoT server 104) providing an event-driven connectivity, an automated risk-transfer system 106, and a network 110 enabling communication between the system components for information exchange. In particular, the IoT server 104, according to the invention, can comprise the inventive developed architectures, protocols, algorithms, and services, e.g. based on a gateway server, which allow networked devices, as mobile phones 102, with typically limited computation and communications capabilities to participate in the proposed connectivity effectively, efficiently, and securely. The invention can be design, as disclosed, building a low-bandwidth consumer networking architecture, comprising the various networking layers and services, as described herein. The risk-transfer system 106 can e.g. comprise an automated first layer risk-transfer system 1061, and an automated second layer risk-transfer system 1062.

For the physical and link layer connectivity, each mobile phone 102 can e.g. be directly connected to the IoT server 104 that provides an intelligent gateway function between the device and the network, as e.g. the world-wide backbone network Internet. The proposed link layer connectivity can be realized to optimize the tradeoffs in different low-cost link layers and physical layers including a custom RS485-based protocol, 100-BaseT Ethernet, IEEE 802.15.4 wireless, and IEEE 1901 power-line carrier networking, telecommunication networks as GSM, GPRS etc., where the mobile phones 102 comprise the appropriate interfaces 1021 for accessing the network 110, such as a cellular GSM-network 1101 with the radio cells 1101 and the base stations 11012, or a IEEE 802 wireless network etc.

The communication can be packet-based, but, however, can be realized to use small packets e.g. of 128 bytes, compatible with these physical and link layers. If IP-connectivity is used in the context of the networking layer connectivity, it e.g. can be based on IPv6 networking. If required, any necessary IPv4 to IPv6 translations or tunnelling can e.g. be handled at the gateway or elsewhere in the system. Every IoT device can have a unique EUI-48 or EUI-64 (EUI=Extended Unique Identifier) address, also known as a MAC address.

Each mobile device 102 can e.g. have a dynamically assigned IP address, e.g. provided by MobileIP, which may share its 64-bit network address with the IoT server and with its 64-bit device address determined by its EUI. Alternatively to a full IPv6 implementation, also 6lowPAN protocol can e.g. be used for communication on the links between the IoT server 104 and the mobile devices 102. 6lowPAN is a protocol designed to extend IPv6 connectivity to devices on specific networks by replacing 128 bit global addresses with 16-bit local addresses, and simplifying and compressing IP and UDP packet structures. The IoT server 104 can e.g. be responsible for allocating a 16-bit local 6lowPAN address to each connected mobile device 102. When communicating between external hosts and the "local" mobile devices 104, the IoT server can e.g. intercept every external packet and effectively act as the network layer endpoint for that packet. The contents can then be interpreted, and appropriate data packets can be forwarded to the device 102 using 6lowPAN. The IoT server 104 can e.g. also act as a firewall for each mobile device 102, where only those packets that correspond to registered services for each of the devices 102 will be forwarded. The two major IP-based transport layer protocols are typically UDP and TCP. The IoT server 104 can e.g. be realized to act as an endpoint for these protocols, and data packets for the mobile devices 102 can e.g. be treated as messages for proxy-services running on the IoT server 104. The IoT server can e.g. be realized to communicate with the mobile devices 102 using UDP over 6lowPAN etc.

As discussed above, as an embodiment variant, the mobile device 102 can e.g. be a smartphone, a tablet, a personal digital assistant, a laptop, or any other type and/or form of mobile device that is capable of communication. In an example, the smartphone 102 may be in periodic or ongoing communication with the IoT server 104 through the network 110. In the context of the use of mobile devices 102 with the IoT server 104, it has to be noted that in the inventive IoT server 104 approach, the used physical objects are interconnected and also connected over the network to the IoT server 102. When implemented this approach enables the connectivity of the client-application gathering the sensory data and running on the mobile device 102. There may be some issues related to addressing the different kinds of mobile devices 102, bandwidth used in the communication, and latency in communications. However, since the main goal is to enable the necessary applications and services, also higher-level protocols can e.g. be used. Due to the diverse possible needs of needed applications and services, as well as the vast number of mobile devices 102, available on the market, these higher-level protocols typically should support extensive configurability and in some embodiment variants allow transmissions of executable code that will later be executed remotely. In another embodiment variant, mobile agents can e.g. be used to gather the sensory data on a defined group of mobile devices 102 to address some of the issues above. In these embodiment variant, the mobile agents can be realized as executable entities that can move from one node, i.e. mobile device 102, to another together with the internal state of the application. This means that an executing agent can pause its execution in current location and continue in a new location. Thus, in this embodiment variant, mobile agents represent a special case of moving code combining remote evaluation with preservation of the internal state. The mobile agents used in this embodiment variant can e.g. preserve the internal state if the application needs that functionality. In some embodiment variants, it is just needed to send the code for remote evaluation.

The use of mobile agents can have certain benefits that can be especially useful for Internet of Things. Among other benefits, the following have special relevance in the realization of the inventive IoT server 104: (i) Mobile agents can reduce the network load. In the present invention, the "things" especially include the sensors of the mobile device 102 that monitor the physical environment and conditions and thus potentially generate hide data flows. If all that sensory data of the mobile device 102 is sent to a server application running on the IoT server 104 on the other end of the network, the network may be flooded with data. A mobile agent running in the thing can reduce the network load by preprocessing the data generated by the sensors; (ii) Mobile agents can also overcome network latency. The latencies of networks, especially in wireless networks, can make real-time control technical difficult to realize. Thus, everything cannot be done in the cloud and IoT server 104, respectively, and local execution can be needed for some embodiment variants; (iii) Mobile agents allow to encapsulate protocols. New protocols get invented frequently and objects in the used IoT should adapt to those. For the inventive system, agents can be good tools for introducing new protocols or data formats to allow changing mobile devices 102 to run with the IoT server 104; and (iv) Mobile agents can be realized to execute asynchronously and autonomously. For the inventive system this means that there is no need to generate network traffic for every execution. In case of wireless networks this can also reduce power consumption. As a special embodiment variant, the present invention proposes using mobile agents in the context of IoT. The inventive mobile agents can e.g. be based on web technologies. They have been tested in various settings. An agent can be e.g. realized to move between different mobile devices 102, and if necessary it is possible to clone agents to create more instances. This enables the implementation of increasingly complex configurations, where mobile device 102 specifications and context specific requirements can also be taken into account. In a further embodiment variant, the system can be based in sending code for execution in a "thing". In the categorization of moving code, this is sometimes called remote evaluation. The code sent to remote mobile devices 102 can expose additional interfaces, for example, in WoT or IoT style. As the inventive system can allow executing code to move with its internal state and because the code and state can further move to a yet another location, i.e. another mobile device 102, the inventive system can be denoted as a mobile agents. It has to be noted, that for normal WoT and IoT applications, the core subset of mobile agent behavior, which is the remote evaluation, is typically enough, but in the present system moving with state and ability to move even further can be realized for the inventive application, thus, benefiting additionally from it.

Figure 1:
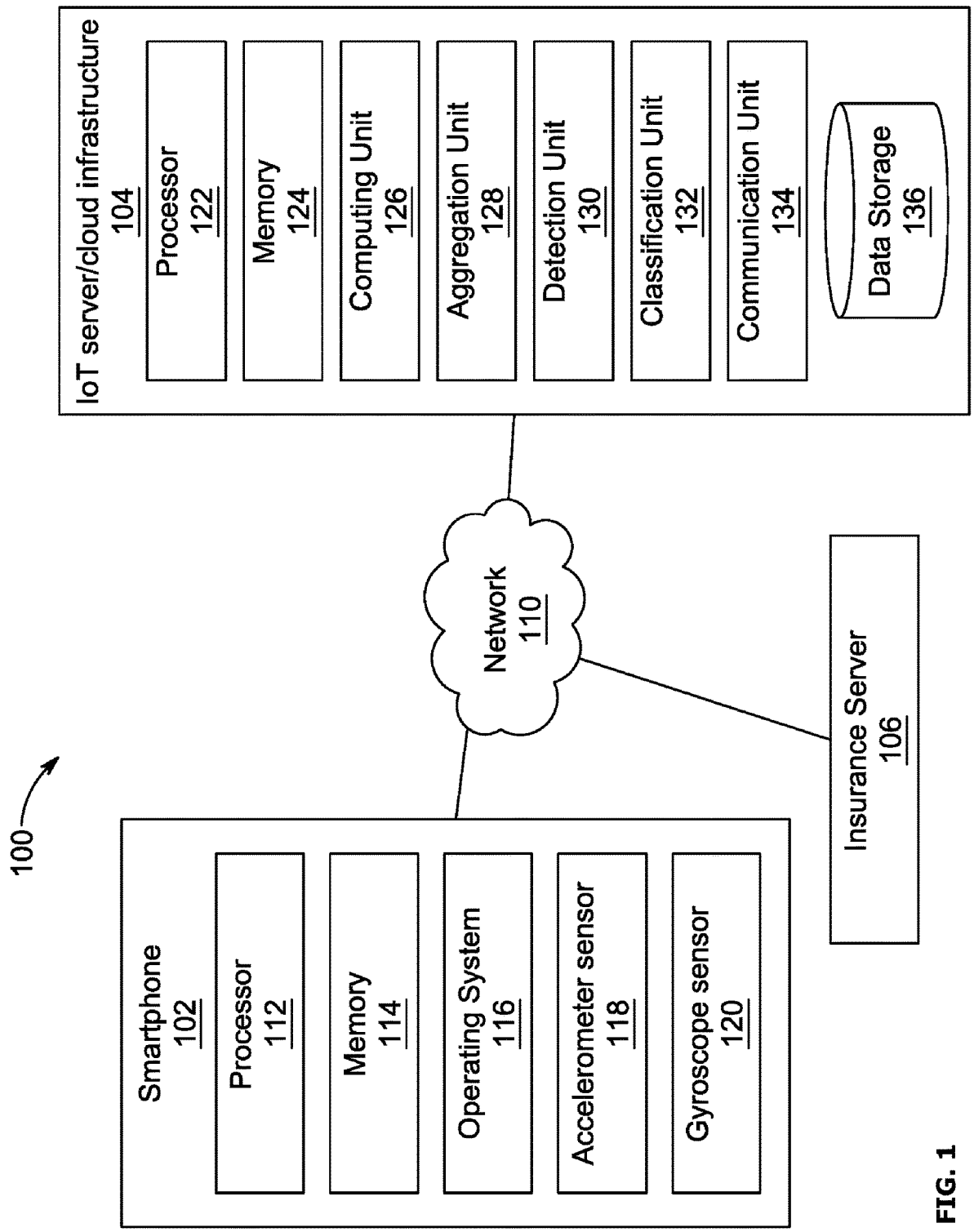
FIG. 1 shows a block diagram, schematically illustrating an exemplary architecture of the inventive system for detecting phone distraction events in moving automobiles and/or motor vehicles 202.
Figure 2:
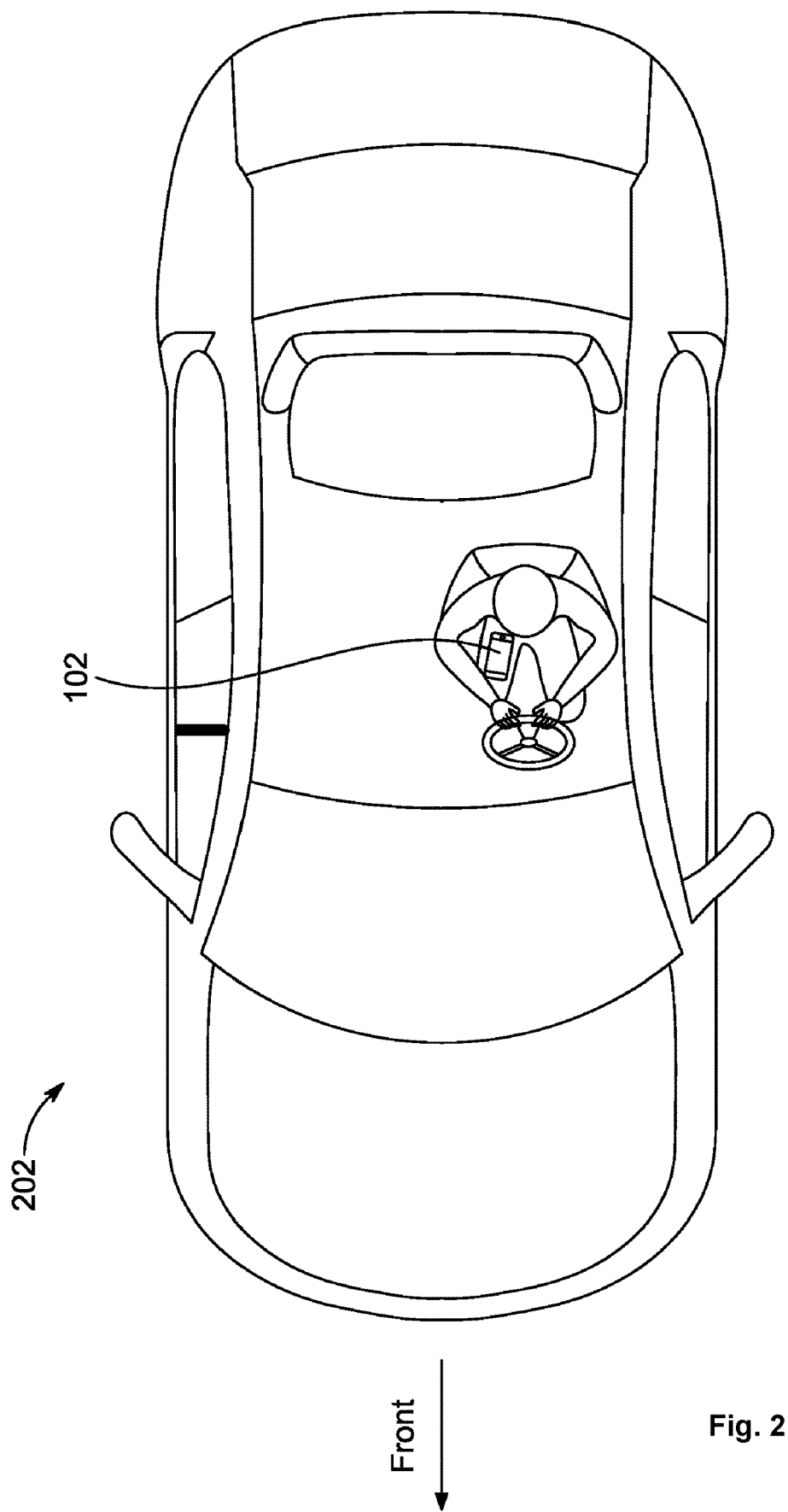
FIG. 2 shows a diagram schematically illustrating an exemplary an automobile and/or motor vehicle 202 with a user carrying a smartphone 102.

In the present invention, the smartphone 102 is used by a user. In an example, the user may be a driver of an automobile or motor vehicle 202, as shown in FIG. 2. In the example of FIG. 2, the user of the automobile 202 is carrying the smartphone 102. The vehicle 202 may be a moving automobile (or another motorized or unmotorized vehicle). The motor vehicle and/or automobile 202 may be interchangeably referred to as the moving vehicle or moving automobile 202 hereinafter. In an embodiment variant, the user may use the smartphone 102 to access communication services including internet, voice, and data communication services. The user may also have one or more social media applications or browser installed on smartphone 102 that may enable the user to access web content or social media websites, such as Facebook®, Twitter®, LinkedIn®, and other social media platforms. The present disclosure is not limited to the smartphone 102. The smartphone 102 is one example of a mobile user device 102 with appropriate sensors.

According to an embodiment variant, the IoT server 104 may be a server capable of establishing, managing, and/or controlling the mobile device 102 over the network 110. For example, the IoT server 104 may control one or more functionalities/features of the smartphone 102 located in the moving vehicle 202. The IoT server 104 can e.g. acquire information about the mobile phone/smartphone 102. The IoT server 104 may use the acquired information to detect phone distraction events associated with the smartphone 102, and/or the user's driving behavior or habits. In an embodiment variant, the IoT server 104 may be owned or managed or otherwise associated with a law-enforcement agency or any entity authorized thereof. The IoT server 104 can e.g. be deployed as and/or executed on any type and form of computing device, for example, a computer, network device, or appliance capable of communicating on any type and form of network (such as the network 110) and performing the operations described herein. In some embodiments, the IoT server 104 can e.g. be implemented across a plurality of servers, thereby, tasks performed by the IoT server 104 may be performed by the plurality of servers. These tasks may be allocated among the cluster of servers by an application, a service, a daemon, a routine, or other executable logic for task allocation.

According to an embodiment variant, the automated insurance system or insurance server 106 may be a server capable of analyzing data (for example, phone distraction events associated with the smartphone 102 and the user's driving behavior or habits) gathered by the IoT server 104 to determine a risk level associated with the user of the vehicle 202. In a further embodiment variant, the insurance server 106 may determine one or more incentives or disincentives for the user based on the risk level associated with the user. The insurance system 106 can e.g. be owned or managed or otherwise associated with an insurance company or any entity authorized thereof. The insurance system 106 can e.g. be managed by a risk-transfer (insurance) provider. In an embodiment variant, the insurance provider may seek to assess the risk level associated with the user of the vehicle 202 and price an insurance policy to protect against that risk. The pricing can e.g. be performed rule-based or by machine-learning by a pricing module realized as a part of the automated insurance system 106.

In a further embodiment variant, the automated risk-transfer (insurance) system or risk-transfer server 106 can e.g. be deployed as and/or executed on any type and form of computing device, for example, a computer, network device 106l1/106l2, or appliance capable of communicating on any type and form of network (such as the network 110) and performing the operations described herein. In some embodiments, the insurance server 106 may be implemented across a plurality of servers, thereby, tasks performed by the insurance server 106 may be performed by the plurality of servers. These tasks may be allocated among the cluster of servers by an application, a service, a daemon, a routine, or other executable logic for task allocation.

According to an embodiment, the network 110 may be a private network or a public network. Further, the network 110 may be connected via wired and/or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Further, the network 110 may be any type and/or form of network. The geographical scope of the network may vary widely and the network 110 can be a body area network (BAN), a personal area network (PAN), a local-area network (LAN), e.g., Intranet, a metropolitan area network (MAN), a wide area network (WAN), or the Internet. The topology of the network 110 may be of any form and may include, e.g., any of the following: point-to-point, bus, star, ring, mesh, or tree. The network 110 may be an overlay network which is virtual and sits on top of one or more layers of other networks. Also, the network 110 may be of any such network topology as known to those ordinarily skilled in the art capable of supporting the operations described herein. The network 110 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 110 may be a type of broadcast network, a telecommunications network, a data communication network, or a computer network.

According to some embodiments, the smartphone 102 may include a processor 112 and a memory 114. In an implementation, the processor 112 may be any logic circuitry that responds to and processes instructions fetched from the memory 114. In many embodiments, the processor 112 may be provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California The processor 112 may utilize instruction-level parallelism, thread-level parallelism, different levels of cache, and multi-core processors. A multi-core processor may include two or more processing units on a single computing component. Examples of multi-core processors include the AMD PHENOM IIX2, INTER CORE i5 and INTEL CORE i7.

The memory 114 may include one or more memory chips capable of storing data and allowing any storage location to be directly accessed by the processor 112. The memory 114 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the memory 114 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The memory 114 may be based on any of the above described memory chips, or any other available memory chips capable of operating as described herein.

According to an embodiment, the smartphone 102 may further include an operating system 116, an accelerometer sensor 118, and a gyroscope sensor 120. In an implementation, the operating system 116 may be, for example, a software including programs and data, that manages hardware of the smartphone 102 and provides services for execution of applications included in the smartphone 102. Known examples of the operating system 116 may include iOS®, Android®, Microsoft® Windows, and Linux. In an implementation, the accelerometer sensor 118 may be a sensor that measures the force of acceleration caused by movement or by gravity or by vibration of the smartphone 102. These forces can be static like gravity force, dynamic senses movement, or vibrations. In an implementation, the accelerometer sensor 118 may measure linear acceleration. In an example, the accelerometer sensor 118 may manage axis-based motion sensing. For example, the accelerometer sensor 118 may measure acceleration readings, with labels such as "x", "y", and "z". These reading may correspond to the motion of the smartphone 102 in a three-dimensional space. In an implementation, the gyroscope sensor 120 may be a sensor that can measure orientation and angular velocity of the smartphone 102. In an example, the gyroscope sensor 120 can measure tilt and lateral orientation of the smartphone 102. For example, the gyroscope sensor 120 may sense angular rotational velocity and acceleration.

According to some implementations, the smartphone 102 may also include a global positioning system (GPS) unit (not shown). The GPS unit may record a speed and a location of the smartphone 102 located in the moving vehicle 202. In an example, the GPS unit may periodically record the speed and the location of the smartphone 102. For example, the frequency of recording may be in the order of minutes, seconds, milliseconds, or some other time period. In other examples, the GPS unit may record the speed and the location of the smartphone 102 at non-periodic time intervals or based on demand. In an example, a start of a vehicle trip and an end of a vehicle trip may be determined from the speed and the location of the smartphone 102 recorded by the GPS unit. The manner in which the GPS unit records the speed and the location of the smartphone 102 is not described in full within this disclosure for the sake of brevity. Also, other ways of estimation and recording of the speed and the location of the smartphone 102 are possible and whilst not explicitly discussed, are contemplated herein. In an example, device sensors such as magnetometers and other such sensors may be used for estimation of the speed and the location of the smartphone 102. According to an implementation, the GPS unit may provide information related to the start of the vehicle trip and the end of the vehicle trip to the IoT server 104 for detection of phone distraction events.

According to an embodiment, the IoT server 104 may include a processor 122 and a memory 124. In an implementation, the processor 122 may be any logic circuitry that responds to and processes instructions fetched from the memory 124. In many embodiments, the processor 122 may be provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California The processor 122 may utilize instruction-level parallelism, thread-level parallelism, different levels of cache, and multi-core processors. A multi-core processor may include two or more processing units on a single computing component. Examples of multi-core processors include the AMD PHENOM IIX2, INTER CORE i5 and INTEL CORE i7.

The memory 124 may include one or more memory chips capable of storing data and allowing any storage location to be directly accessed by the processor 122. The memory 124 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the memory 124 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The memory 124 may be based on any of the above described memory chips, or any other available memory chips capable of operating as described herein.

According to an embodiment, the IoT server 104 may include a computing unit 126, an aggregation unit 128, a detection unit 130, a classification unit 132, a communication unit 134. In an implementation, the computing unit 126, the aggregation unit 128, the detection unit 130, the classification unit 132, and the communication unit 134 may be coupled to the processor 122 and the memory 124. In some embodiments, the computing unit 126, the aggregation unit 128, the detection unit 130, the classification unit 132, and the communication unit 134 amongst other units, may include routines, programs, objects, components, data structures, etc., which may perform particular tasks or implement particular abstract data types. The computing unit 126, the aggregation unit 128, the detection unit 130, the classification unit 132, and the communication unit 134 may also be implemented as, signal processor(s), state machine(s), logic circuitries, and/or any other device or component that manipulate signals based on operational instructions.

In some embodiments, the computing unit 126, the aggregation unit 128, the detection unit 130, the classification unit 132, and the communication unit 134 may be implemented in hardware, instructions executed by a processing unit, or by a combination thereof. The processing unit may comprise a computer, a processor, a state machine, a logic array, or any other suitable devices capable of processing instructions. The processing unit may be a general-purpose processor that executes instructions to cause the general-purpose processor to perform the required tasks or, the processing unit may be dedicated to performing the required functions. In some embodiments, the computing unit 126, the aggregation unit 128, the detection unit 130, the classification unit 132, and the communication unit 134 may be machine-readable instructions which, when executed by a processor/processing unit, perform any of the desired functionalities. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, the machine-readable instructions may be stored in memory 124.

In some embodiments, the IoT server 104 may include a data storage 136. In an implementation, the data storage 136 may store information related to phone distraction events associated with the smartphone 102 of the user and the user's driving behavior or habits. In an implementation, information stored in the data storage 136 may be periodically or dynamically updated as required.

According to an embodiment, for the purpose of detecting phone distraction events that might occur during a vehicle trip, the computing unit 126 may receive phone data captured by the smartphone 102 located in the moving vehicle 202. In an example, the phone data may include operating system data that is captured by the smartphone 102 using the operating system 116, and sensor data that is captured by the smartphone 102 using one or more sensors (such as, accelerometer sensor 118 and the gyroscope sensor 120) built into the smartphone 102. In an implementation, the phone data may include one or more chunks of data streams associated with an IoT service from the smartphone 102. In an example, each of the one or more chunks of data streams may be of a fixed size. Further, each chunk may be considered as an independent block. In an implementation, a predefined amount of information may be shared between two different chunks. Accordingly, the amount of information that needs to be shared between different chunks of a data stream and processed is minimized.

In a further embodiment variant, the computing unit 126 may analyze the phone data to compute or identify one or more phone handling events associated with the smartphone 102 during a trip as e.g. an automobile or other vehicle trip. However, the phone distractions can be detected for all recorded trips not only for vehicle trips. In an example, a phone handling event may refer to an event where the user of the smartphone 102 performs an action on the smartphone 102. For example, a phone handling event may be an event where the user of the smartphone 102 picks up the smartphone 102, moves the smartphone 102, and/or otherwise handles the smartphone 102, as opposed to other times during the vehicle trip where the smartphone 102 is resting, mounting, or otherwise stationary in the moving vehicle 202 or at least fixed in the moving vehicle 202 relative to the motion of the moving vehicle 202 itself). In an example, the one or more phone handling events may interchangeably be referred to as one or more discrete events. In an example, each of the one or more discrete events is categorized into one of an opening event and a closing event. The opening event may include at least one of a device unlock event of the smartphone 102 and a device movement event of the smartphone 102. The closing event may include at least one of a device lock event of the smartphone 102, a device orientation change event of the smartphone 102, and a vehicle trip end event. Thus, the computing unit 126 may determine which type of action the user is performing when he or she is handling the smartphone 102.

Thus, the system 1 can e.g. measure three type of data and time series of data, respectively: (i) Discrete events coming from phone 102 OS (Operative System) 116: phone 102 locks and unlocks events; (ii) Discrete events computed directly on the phone 102 starting from phones' gyroscope sensors 120 that aim to identify rotations of the phone 102; (iii) Discrete events computed in the backend starting from phones' accelerometer sensors 118. These events identify phone handlings; (iv) Additional features that are based on phone accelerations and GPS speed, e.g. measured by a GPS sensor of the phone 102. Discrete events and features can now be used to compute phone distractions events. In providing the structure for detecting phone distractions, it has to be taken into account of certain technical implementation constraints given by the IoT cloud infrastructure 104 (if used). In the adopted streaming IoT paradigm, data are consumed in chunks of fixed size and only a restricted amount of information can be shared between two different chunks. This implies for example that is not possible to design a technical structure that expects in input the whole raw accelerometers time series of a trip because it would exceed the amount of information that can be stored inside a chunk. To address this point, the following technical approach can e.g. be used: (a) Generate discrete events and features associated to a chunk of the measured data stream by treating every chunk and associated generation as an independent block; (b) Consume the generated discrete events and features with an online generation structure. The choice of an online structure enables the system 1 to minimize the amount of information that needs to be shared between different chucks of the data stream. In the following, as a first step, the generation of the discrete events and features is described and after as a second step, how the online generation consumes these data to detect phone distraction events.

In an embodiment variant, the computing unit 126 may receive one or more chunks of a data stream from the operating system 116 of the smartphone 102. The computing unit 126 may process the one or more chunks of the data stream to compute at least one of a device lock event and a device unlock event associated with the smartphone 102. In an example, the device lock event may occur when the smartphone 102 has been locked due to a number of reasons. In one example, the user of the smartphone 102 may deliberately lock the smartphone 102 in order to avoid unwilling actions on a screen of the smartphone 102. In another example, the smartphone 102 may automatically get locked after a certain time period (for example, a timeout period configured in smartphone settings). In an example, the device unlock event may occur when the user of the smartphone 102 unlocks the smartphone 102. For example, the user may unlock the smartphone 102 by authorizing his or her access to the smartphone 102 via different methods, such as through a password, a sequence, a fingerprint, or a face ID. In an implementation, the computing unit 126 may process each of the one or more chunks of the data stream individually to compute at least one of the device lock event and the device unlock event. In some implementations, the computing unit 126 may process the one or more chunks of the data stream collectively.

In some embodiments, the operating system 116 may compute at least one of the device lock event and the device unlock event associated with the smartphone 102. Further, the computing unit 126 may obtain the at least one of the device lock event and the device unlock event from the operating system 116 of the smartphone 102 through the one or more chunks of the data stream.

In another embodiment variant, the computing unit 126 may receive one or more chunks of a data stream from the accelerometer sensor 118 of the smartphone 102. In an example, the data stream received from the accelerometer sensor 118 may be an acceleration signal (i.e., an acceleration of the smartphone 102 sensed by the accelerometer sensor 118). The computing unit 126 may process the one or more chunks of the data stream to compute at least one device movement event associated with the smartphone 102. Examples of the device movement events associated with the smartphone 102 include, but are not limited to, a phone pick-up event and a phone put-down event. In an example, the phone pick-up event may occur when the user of the smartphone 102 picks up the smartphone 102 from a lying position, for example, from a pocket, a bag, a phone holder, and the like. Further, in an example, the phone put-down event may occur when the user puts down the smartphone 102 in the lying position. In an example implementation, the manner in which the computing unit 126 computes the device movement event associated with the smartphone 102 is described hereinafter.

According to an embodiment variant, the computing unit 126 may calculate an acceleration norm signal (interchangeably referred to as norm of the acceleration signal) based on the one or more chunks of the data stream. In an example, the computing unit 126 may implement an Android® reference system to calculate the acceleration norm signal. However, this should not be construed as a limitation. Other reference systems, such as an iOS® reference system may be implemented alternatively by the computing unit 126. In general, Android® and iOS® phones use different convention systems in measuring accelerations. In an example, iOS™ phones express acceleration in g unit while Android® phones use m/s² unit with opposite sign with respect to iOS® phones. The following transformation (expressed using equation (1)) is used to ensure compatibility between the two conventions systems:

$$a_{Android}(t) = -a_{iOS}(t)g \ldots \quad (1)$$

In the above equation (1), g represents the acceleration of gravity near the earth surface, g≅9.807 m/s², $a_{Android}(t)$ and $a_{iOS}(t)$ refers respectively to any of the 3 accelerometers component sensed by the accelerometer sensor(s) of an Android® phone and an iOS® phone.

In an implementation, the acceleration norm signal may be mathematically illustrated as follows in equation (2):

$$a(t) = \sqrt{(a_x(t)^2 + a_y(t)^2 + a_x(t)^2}$$

(2)

Figure 3:
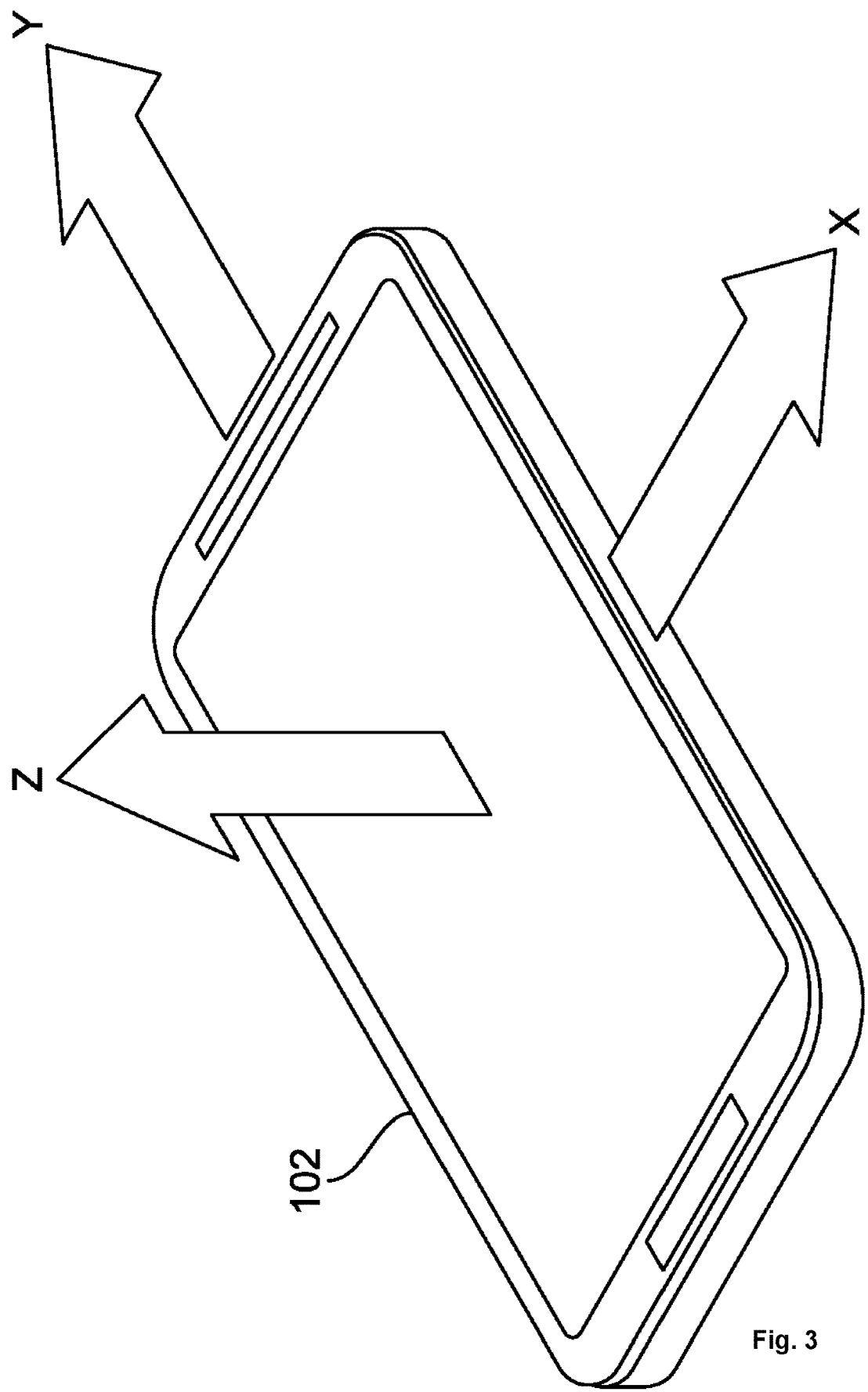
FIG. 3 shows a diagram of another embodiment variant, schematically illustrating exemplary x, y, and z components of acceleration of the smartphone and/or mobile phone 102. In particular.

In the above equation (2), a(t) represents the acceleration norm signal and $a_x(t)$, $a_y(t)$, and $a_z(t)$ represent respectively x, y, and z components of the acceleration of the smartphone 102 sensed by the accelerometer sensor 118. The x, y, and z components of the acceleration of the smartphone 102 are depicted in FIG. 3.

According to an implementation, the computing unit 126 may filter the acceleration norm signal based on a predefined threshold θ to detect a plurality of device movement candidates. In an implementation, each of the plurality of device movement candidates may be characterized by a start time and an end time. In an example, the computing unit 126 may detect the plurality of device movement candidates by isolating portions of the acceleration norm signal that are above the predefined threshold θ. In an example implementation, the computing unit 126 may generate the plurality of device movement candidates $c_i(t)$, characterised by a start time $s_i$ and an end time $e_i$ where i=1 . . . n and n is the last device movement candidate that is filtered.

In an implementation, the computing unit 126 may merge two or more device movement candidates from amongst the plurality of device movement candidates to generate a merged device movement candidate when a time difference between start time of a subsequent device movement candidate of the two or more device movement candidates and an end time of a current device movement candidate is less than a predetermined device movement threshold T. In an example, two or more device movement candidates are merged together if they are temporal near, i.e., $s_{i+1} - e_i < \tau$. For example, the start time of the subsequent device movement candidate $c_{i+1}$ should be less then τ seconds far from the end time of the current device movement candidate $c_i$ to produce a merged device movement candidate $C_i$. The start time and the end time of the merged device movement candidate $C_i$ are set respectively to the start time of the current device movement candidate and the end time of the subsequent device movement candidate.

The start time of the merged device movement candidate $C_i$ may be mathematically illustrated as follows in equation (3):

$$S_i = s_i \quad (3)$$

The end time of the merged device movement candidate $C_i$, may be mathematically illustrated as follows in equation (4):

$$E_i = e_{i+1} \quad (4)$$

FIG. 4 depicts a graphical representation 400 of the acceleration norm signal that is filtered to generate the plurality of device movement candidates, according to some embodiments.

In the example of FIG. 4, the acceleration norm signal is filtered to generate a plurality of device movement candidates that are then merged together based on the time distance that separates each consecutive device movement candidate pair. As described in FIG. 4, the acceleration norm signal is filtered to generate three device movement candidates, $c_i$, $c_2$, and $c_3$. The device movement candidates $c_2$ and $c_3$ are merged together to generate a merged device movement candidate $C_2$ as they are temporal near, i.e., $S_3 - e_2 < \tau$.

Although, it has been described that one merged device movement candidate is generated, it may be understood that more than one merged device movement candidate may be generated based on the phone data received from the smartphone 102.

Referring again to FIG. 1, subsequent to generation of the merged device movement candidates, the computing unit 126 may symmetrically enlarge the merged device movement candidates to generate enlarged merged device movement candidates. The enlarged device movement candidates may be mathematically illustrated as follows in equations (5) and (6):

$$s_i = s_i - \epsilon \quad (5)$$

$$e_i = e_i + \epsilon \quad (6)$$

In the above equations (5) and (6), $s_i$ and $e_i$ denote respectively the start time and the end time of the merged device movement candidates.

In an implementation, the computing unit 126 may compute a dispersion index for each of the enlarged merged device movement candidates. Further, as the accelerometer sensor 118 can sense slightest of variations (for example, due to vehicle vibrations) or large instantaneous peaks (for example, due to speed bumps), filtering of the data stream becomes necessary. According to an implementation, prior to computing the dispersion index for each of the enlarged merged device movement candidates, the computing unit 126 may exclude or filter noisy signal parts of the accelerations and retain flat signal parts. In an example, the computing unit 126 may exclude noisy signal parts of an enlarged merged device movement candidate by considering a high discrete derivative of the acceleration norm signal. FIG. 5 depicts a graphical representation 500 of a noisy signal part and a flat signal part of an enlarged merged device movement candidate, according to some embodiments.

According to an implementation, the computing unit 126 may compute the dispersion index for each of the enlarged merged device movement candidates using equation (7) provided below.

$$d := \left( \sum_{k=1}^{n} \left( (a_x, a_y, a_z)_k - \frac{1}{n} \sum_{j=1}^{n} (a_x, a_y, a_z)_j \right)^2 \right)^{1/2} \quad (7)$$

In the above equation (7), $(a_x, a_y, a_z)_k$ represents the vector of the discrete k-sample of each enlarged merged device movement candidate that is in general characterized by n' discrete vector samples. For the sake of clarity, among n' discrete vector samples of an enlarged merged device movement candidate, only n discrete vector samples associated to flat signal parts of the enlarged merged device movement candidate are considered in evaluating the dispersion index. Regarding the data samples considered, it is to be noted that reason to exclude certain part of the signal lies in the goal to exclude noisy parts of the signal that can corrupt the value of the dispersion index feature, rather than simplifying the computation or data processing.

In an implementation, the computing unit 126 may compute a quantile for each of the enlarged merged device movement candidates. The quantile can e.g. be computed on the signal samples of the measured norm signal associated to the merged candidate. In an example, the computing unit 126 may compute 0.8 quantile for each of the enlarged merged device movement candidates. According to an implementation, the computing unit 126 may determine one or more device movement events of the smartphone 102 based on the dispersion index and the quantile of each of the enlarged merged device movement candidates. In an implementation, the computing unit 126 may apply a predetermined set of rules learned on data on the enlarged merged device movement candidates to determine the one or more device movement events of the smartphone 102. Since the one or more device movement events are determined from amongst the device movement candidates, the number of false positives are minimized, i.e., precision is given more priority over recall.

According to an implementation, the computing unit 126 may receive one or more chunks of a data stream from the gyroscope sensor 120 of the smartphone 102. The computing unit 126 may process the one or more chunks of the data stream to compute one or more device movements associated with the smartphone 102. In an implementation, the action of picking up the smartphone 102 from a lying position causes a sensible change in orientation of the smartphone 102 itself. This change in orientation may take place in a few seconds and lasts for as long as the smartphone 102 is being used, before returning to a lying position.

According to an implementation, the computing unit 126 may measure a rotation rate along x axis and y axis of the smartphone 102 (i.e., x and y components of the gyroscope sensor 120) over a moving window of fixed length. In an example, a device movement may be detected when a set of conditions are fulfilled. The set of conditions may include a first condition "$g_x^w > \rho_1$," a second condition "$g_x^w > \rho_2$", and a third condition "$g_x^w > \rho_3$". In an example, $g_x^w$ and $g_y^w$ are respectively the mean of the rotation rate of the x axis and y axis of the smartphone 102 over the window w. For example, the device movement may be detected when both the first condition and the second condition are met, or when the third condition is met.

In some embodiments, the computing unit 126 may compute the device orientation change events (here a different name is adopted for distinguishing implicitly the first category of device handling events—device movements—described in the previous paragraphs from the one described in what follows) associated with the smartphone 102 based on two solutions, namely a first solution and a second solution. According to the first solution, the computing unit 126 may compute the device orientation change event based on detecting the changes of the relative order of the accelerometer components. In an implementation, the three accelerometer components $a_x(t), a_y(t)$, and $a_z(t)$ may be relatively ordered at each instant of time t. Since the accelerometer components are three (3), there can be six (6) different possible ways of ordering the accelerometer components based on an assumption that $a_x(t) \neq a_y(t) \neq a_z(t) \; \forall \; t$. In an example, each ordering of the accelerometer components may be referred to as a configuration. As may be understood, the configuration is fixed and associated to the possible relative orders of the three accelerometer components $a_x(t), a_y(t),$ and $a_z(t)$.

According to an implementation, the computing unit 126 may map each instant of time t to a configuration with a discontinuous function k(t). In an example, due to noise that may affect the data stream from the accelerometer sensor 120, different values of discontinuous function k(t). may be generated. The computing device 126 may process the discontinuous function k(t) with a moving median filter to obtain a smoothed signal k'(t) (i.e., smoothed version) of the discontinuous function k(t). In an example, every instant of time in which a change of the smoothed signal k'(t) occurs is called a device orientation change event. In an implementation, the smoothing of the original signal k(t) may contribute to keep the number of device orientation change events false positives controlled, by filtering out device orientation change events that occur only for a short time.

According to an implementation, the computing device 126 may target to prioritize recall over precision of true device orientation change events.

According to the second solution, the computing unit 126 may compute roll and pitch angles of the smartphone 102. In an example, pitch, roll, and yaw angles are commonly used to describe the rotation of a rigid body (around x, y, and z axes) with respect to a given reference frame. A roll angle is a rotation angle $\omega \in [-180°, 180°]$ around x axis. A pitch angle is a rotation angle $\varphi \in [-90°, 90°]$ around y axis. A yaw angle is a rotation angle $\kappa \in [-180°, 180°]$ around z axis. In an implementation, the rotation around the x, y, and z axes of angle respectively $\omega$, $\varphi$, $\kappa$ describe a general rotation of a rigid body in the space. FIG. 6 depicts a roll angle, a pitch angle, and a yaw angle with reference to the smartphone 102, according to some embodiments.

According to an implementation, the computing unit 126 may compute, starting from $(a_x, a_y, a_z)$ device's accelerometer sensor components, the roll angles using equation (8) and pitch angles using equation (9), provided below.

$$\omega = \arctan(a_y/a_z) \quad (8)$$

$$\varphi = \arctan\left(\frac{-a_x}{\sqrt{a_y^2 + a_z^2}}\right) \quad (9)$$

In an implementation, the computing unit 126 may identify one or more orientations based on the computed roll and pitch angles and a set of defined configurations. The computing unit 126 may identify different orientations based on determining whether the computed roll and pitch angles belong to the set of defined configurations. In an example, the set of defined configurations may be mathematically illustrated as follows in equation (10):

$$\text{conf}_i : \omega \in [\alpha_i, \beta_i], \varphi \in [\gamma_i, \delta_i] \quad (10)$$

In an example, the set of defined configurations may be controlled by defining the regions $[\alpha_i, \beta_i]$ and $[\gamma_i, \beta_i]$ to which roll and pitch angles must belong to. According to an implementation, the computing unit 126 may determine the device orientation change event of the smartphone 102 based on the identified one or more orientations. In an example, a transition from one configuration to another configuration is considered as a device orientation change event. Thus, the possibility of controlling the configurations accessible by the smartphone 102 assist in excluding meaningless change of orientations that in the first solution could arise when two components of the acceleration signals change their relative order in connection, for example, to noise of the signal, harsh events that might occur during the vehicle trip and metastable positions of the smartphone 102 characterized by two components being near (for example, when the smartphone is 45° tilted around both the x and the y axis).

In an implementation, the set of defined configurations may easily capture typical orientations of the smartphone 102 during its usage. For example, during a call, the smartphone 102 is expected to be rotated by $\omega \cong 90°$ and $\varphi \cong 30$. While during messaging, the smartphone 102 is expected to be rotated by $\omega \cong 45°$ and $\varphi \cong 0°$. Accordingly, positions of the smartphone 102 that cannot be associated to a phone distraction are excluded. For example, when the smartphone 102 has the screen pointing to the ground ($\omega \cong 180°, \varphi \cong 0°$, it is not associated to a phone distraction. In some examples, specific events that might be detected as phone distraction are excluded. For example, when the smartphone 102 is in a GPS navigation mode horizontally mounted on a windscreen shield of the vehicle 202, specific angles may characterize the position of the smartphone 102. Accordingly, such type of smartphone 102 usage may not be considered as phone distraction. This ensures that no phone distraction false positives are triggered by an orientation change. Thus, the computing unit 126 computes one or more discrete events associated with the corresponding one or more chunks of data streams.

According to an implementation, the aggregation unit 128 may aggregate the one or more discrete events (or the one or more phone handling events) into one or more macro events (interchangeably referred to as one or more phone distraction candidates). In an implementation, the one or more macro events are cached till final phone distraction events are detected. In an example, a phone distraction event may be composed of more than one macro event. Thus, the macro events are cached and only merged if certain conditions are fulfilled. In an implementation, the aggregation unit 128 may perform computation in two states, namely, an open task state and a close task state. In an example, the open task state may refer to a state when the phone distractions to be released in output are not yet determined and the close task state may refer to a state when specific conditions are fulfilled that allow phone distractions so far computed to be released in output.

In an implementation, the aggregation unit 128 may aggregate the one or more discrete events that are categorized into opening events into the one or more macro events. According to an implementation, the aggregation unit 128 may receive an opening event $e_t$ (i.e., a discrete event) at time t. Subsequently, the aggregation unit 128 may create a new macro event (i.e., mark the start of a new macro event) if the computation state of the aggregation unit 128 is close task state and the opening event received is a device unlock event. The aggregation unit 128 may add the macro event to the cache.

In some implementations, the aggregation unit 128 may create a new macro event if the computation state of the aggregation unit 128 is close task state and the opening event received is a device movement event that is occurring at least after $\sigma_1$ seconds from the end of the last phone distraction that has been just released as output by the aggregation unit 128 (the aggregation unit 128 being in the close task state). In an example, the $\sigma_1$ seconds threshold has been introduced in order to avoid a device movement event, which might arise at the end of a phone distraction can trigger the start of a new phone distraction. According to an implementation, the aggregation unit 128 may extend the last macro event cached (if any) if the aggregation unit 128 is open task state and an opening event (for example, a device unlock event or a device movement event) is received within $\sigma_2$ seconds from the end of the last macro event cached. According to some implementations, the aggregation unit 128 may mark the start of new macro event if the aggregation unit 128 is in open task state and an opening event is received after $\sigma_2$ seconds from the end of the last macro event cached.

According to an implementation, the detection unit 130 may process the aggregated one or more macro events based on a set of preconfigured rules to detect/determine at least one phone distraction event. In an example, the set of preconfigured rules may be based on one or more predefined thresholds to determine the phone distraction event. In an implementation, the detection unit 130 may receive a closing event $e_t$ at time t. Upon receiving the closing event $e_t$, the detection unit 130 may search for the last macro event that includes a device unlock event in the list of cached macro events. If a macro event includes a device unlock event (hereinafter referred to as macro event μl), the detection unit 130 may apply at least one of the following rules to detect at least one phone distraction event.

Rule 1

In an implementation, if the closing event $e_t$ is a device orientation change event that occurs at least after τ>0 seconds from the end time of the macro event μt, the detection unit 130 may detect a new phone distraction event, where a start time of the phone distraction event may be equal to the start time of the macro event μ. In an example, an end time of the phone distraction event may be set equal to the end time of the device orientation change event. In an implementation, the detection unit 130 may discard all the possible macro events that might be cached between the start time and the end time of the new phone distraction event. Further, the detection unit 130 may include characteristics of the discarded macro events in the new phone distraction event. In an implementation, the detection unit 130 may detect all the macro events cached before the start time of the device unlock event as phone distraction events. The detection unit 130 may release the macro events in output together with the last phone distraction event created. The computation state of the detection unit 130 may then be set to close task state. The predetermined device movement threshold T is used to prevent ending the phone distraction too soon for example of a device orientation change event linked to a manipulation of the smartphone 102 that may occur just after the device unlock event. In an example, the device orientation change event may be used to end any type of usage of the smartphone 102 that includes unlocking of the smartphone 102 and in which the smartphone 102 might be left unlocked after its usage.

Rule 2

In an implementation, if the closing event $e_t$ is a device lock event, the predetermined device movement threshold τ is set to zero (0) as the device lock event is considered as an end of phone distraction. The computation state of the detection unit 130 may then be set to close task state. The predetermined device movement threshold τ is used to prevent ending the phone distraction too soon for example of a device orientation change event linked to a manipulation of the smartphone 102 that may occur just after the device unlock event.

Rule 3

In an implementation, if the closing event $e_t$ is a vehicle trip end event, the detection unit 130 may release the macro events that might be still cached in output. The computation state of the detection unit 130 may then be set to close task state.

According to some implementations, vehicle trip end event false positives may arise mainly for two reasons. First reason being usage of the smartphone 102 when the vehicle 202 is already parked but the vehicle trip recording is still active. This may happen because in general the vehicle trip recording does not end exactly when the vehicle 202 is parked but as soon as enough data is available to decide if the vehicle trip is finished or not. In some scenarios, data about when the vehicle trip recording has to be stopped is affected by an error that results in forcing the smartphone 102 to record data for some minutes after the vehicle trip actually end. Further, the second reason may be that exit from vehicle movements not associated to smartphone 102 usage that might trigger spurious movements of the smartphone 102 and consequently phone distractions.

In an implementation, to avoid the vehicle trip end event false positives to be wrongly detected as phone distractions, the detection unit 130 may apply a filtering logic governed by a predefined threshold ρ based on the temporal distance between a start time of a phone distraction candidate and a predicted vehicle trip end event. In an example, the predicted vehicle trip end event time may be determined based on trip recording logic. In another example, the predicted vehicle trip end event time may be determined based on GPS data and data received from the accelerometer sensor 118. In an example, if a given data chuck is predicted to be associated to a vehicle trip end event, then the end time of the data chunk is considered as a vehicle trip end event and all phone distractions that start within p milliseconds from the predicted vehicle trip end event are not released in output.

FIG. 7 depicts generation of phone distractions from the discrete events associated with the smartphone 102, according to some embodiments. As described in FIG. 7, three phone distractions, namely a first phone distraction, a second phone distraction, and a third phone distraction are generated from the discrete events.

In the example of FIG. 7, a device movement event 702 is marked as the first phone distraction candidate. Further, a device movement event 704 is received after $\sigma_2$ seconds from the end of the device movement event 702. Therefore, the device movement event 704 is not merged with the first phone distraction and is marked as a start of the second phone distraction. As described in FIG. 7, the second phone distraction is extended to include a device unlock event 706 as the device unlock event 706 is received within $\sigma_2$ seconds from the end of the device movement event 704. In the example of FIG. 7, a device orientation change event 708 occurs just after the device unlock event 706. The predetermined device movement threshold τ is used to prevent ending the second phone distraction too soon for example of the device orientation change event 708 linked to a manipulation of the smartphone 102 that may occur just after the device unlock event 706. Further, a device lock event 710 triggers the second phone distraction to be closed. The first phone distraction and the second phone distraction may be released in output.

As can be seen in FIG. 7, a device movement event 712 may occur within $\sigma_1$ seconds from the end of the second phone distraction. In an example, the $\sigma_1$ seconds threshold prevents the device movement event 712 to trigger a start of a new phone distraction. Further, a device movement event 714 is received after $\sigma_2$ seconds from the end of the device movement event 712. Therefore, the device movement event 714 is not merged with the device movement event 712 and is marked as a start of the third phone distraction. Further, a device movement event 716 is not released in the output as a vehicle trip end event 718 start within p milliseconds from the start of event 716.

Referring back to FIG. 1, according to an implementation, the classification unit 132 may measure a level of phone distraction from the at least one phone distraction event. In an implementation, the classification unit 132 may measure the level of phone distraction based on assigning a score (or a risk score) using at least one of a binary scoring or a scoring index. In an example, the classification unit 132 may assign a risk score of 0 to the user if there are less than two (2) phone distraction events during the vehicle trip. In another example, the classification unit 132 may assign a risk score of 1 to the user if there are more than three (3) phone distraction events during the vehicle trip.

According to an implementation, the classification unit 132 may assign a level indicator to the at least one phone distraction event based on risk involved. In an implementation, the classification unit 132 may assign a level one indicator to a phone distraction event that occurred when the vehicle 202 is in a still position. For example, the classification unit 132 may assign a level one indicator to a phone distraction event that occurred when the vehicle 202 is at zero speed near a traffic light. In an implementation, the classification unit 132 may assign a level two indicator to a phone distraction event that may be of a short duration and occurs when the vehicle 202 is moving. Examples of such phone distraction events include a quick movement of the smartphone 102 and a fast manipulation of the smartphone 102. In some implementations, the classification unit 132 nay assign a level three indicator to a phone distraction event that may be of a long duration. Examples of such phone distraction events include prolonged phone calls while driving and prolonged texting/messaging. According to an implementation, the classification unit 132 may classify driving behavior of the user of the smartphone 102 based on the one or more phone distractions. In an implementation, the classification unit 132 may store the information related to the at least one distraction event associated with the smartphone 102 and the user's driving behavior in the data storage 136 for future use.

In an implementation, the communication unit 134 may provide data including the information related to the at least one phone distraction event associated with the smartphone 102 of the user and the user's driving behavior to the risk-transfer server 106, for example, based on a request from the risk-transfer server 106.

The risk-transfer server 106 may comprise mutually and electronically switched, automated first and second risk-transfer systems 1061/1062. The first automated risk-transfer system 1061 can e.g. comprise an automated, electronic first resource-pooling system 10611 comprising a first data store or persistence storage 106111 comprising first electronic payment parameter 1061111, e.g. enabled to represent a generated monetary amount of defined premiums. The automated, electronic first resource-pooling system 10611 can further comprise electronic first payment transfer modules 106112 enabling electronic payment transfer from a user of the mobile phone 102 to the automated, electronic first resource-pooling system 10611, e.g. over the network 110 to balance a transferred user's risk in having an impact of a future occurring accident event during driving the motor vehicle 202. The first data store or persistence storage 106111 can e.g. further comprise generated risk transfer profiles 1061112, where the risk-transfer profiles 1061112 e.g. comprise measured risk-scores quantifying the occurrence and/or impact of phone distraction events associated with a user of a mobile phone 102 based on the measured distraction events, or any other risk-measure generated based on the measured and captured telematics and sensory data 31/32/33. The measured risk-measures can e.g. be used to generate and determine the monetary amount of defined premiums. The automated, electronic second resource-pooling system 10612 can further comprise electronic second payment transfer modules 106122 enabling electronic payment transfer from the automated first risk-transfer system 10611 to the automated, electronic second resource-pooling system 10612, e.g. over the network 110. The second data store or persistence storage 106121 can e.g. further comprise generated risk transfer profiles 1061122, where the risk-transfer profiles 1061122 e.g. comprise quantified risk measures associated with a portfolio of risk-transfers of the first risk-transfer system 10611 based on the measured distraction events, or any other risk-measure generated based on the measured and captured telematics and sensory data 31/32/33 associated with the risk-transfers of the portfolio.

In an example, the communication unit 134 may provide the risk score of the user to the risk-transfer server 106. According to an implementation, the risk-transfer server 106 may analyze the data for performing risk analysis of the user of the vehicle 202. In an example, the insurance provider may determine appropriate insurance products or premiums for the user according to such risk analysis. According to an implementation, the risk-transfer server 106 may implementation a gamification method to reward and recognize the user. In an implementation, the risk-transfer server 106 may use the risk score of the user to determine an insurance premium for the user. In an example, the risk-transfer server 106 may offer rewards (for example, gift card, coupons, points, or any other inventive) to the user when the risk score of the user is above a predefined threshold. In an implementation, the insurance server 106 may send incentives, warnings, or other information to the user to encourage risk-reducing behavior and discourage risk-increasing behavior during the term of an insurance policy of the user. In on example, a distracted driver may need to pay a higher premium to get insurance coverage for an insurance-policy.

According to some implementations, the detected phone distractions may be used in a gamification framework of a telematics application. In an implementation, a gamification score may be computed for each of the phone distractions. The gamification score may offer a better view of correct driving behavior, for example, on a weekly basis.

FIG. 8 depicts a flow chart 800 for detecting phone distraction events in moving vehicles, according to some embodiments.

At step 802, the IoT server 104 may receive sensor data captured by the smartphone 102 using one or more sensors built into the smartphone 102 during a vehicle trip. The sensor data may include one or more chunks of data streams associated with an IoT service from the smartphone 102. In an implementation, the IoT server 104 may obtain the sensor data from at least one of the accelerometer sensor 118 and the gyroscope sensor 120 located in the smartphone 102.

At step 804, the IoT server 104 may analyze the sensor data to identify one or more phone handling events associated with the smartphone 102 during the vehicle trip. In an example, each of the one or more phone handling events may be categorized into one of an opening event and a closing event. The opening event may include at least one of a device unlock event associated with the smartphone 102 and a device movement event associated with the smartphone 102. The closing event may include at least one of a device lock event associated with the smartphone 102, a device orientation change event associated with the smartphone 102, and a vehicle trip end event.

At step 806, the IoT server 104 may aggregate the one or more phone handling events associated with the smartphone 102 into one or more macro events.

At step 808, the IoT server 104 may process the aggregated one or more macro events based on a set of preconfigured rules to detect a phone distraction event. In an example, the set of preconfigured rules are based on predefined thresholds to detect the phone distraction event.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

The invention claimed is:

1. A system for detecting phone distraction events in a moving vehicle, the system comprising:
   a smartphone of a driver of the moving vehicle; and
   an Internet of Things (IoT) server communicatively coupled to the smartphone, wherein
   the smartphone includes one or more sensors built into the smartphone,
   sensor data of the one or more sensors is captured by the sensors of the smartphone during a vehicle trip and is transmitted to the IoT server,
   the sensor data includes one or more chunks of data streams associated with an IoT service from the smartphone,
   the IoT server is configured to:
      analyze the sensor data to identify one or more phone handling events associated with the smartphone during the vehicle trip, wherein
         each of the one or more phone handling events is categorized into one of an opening event and a closing event,
         the opening event includes at least one of a device unlock event associated with the smartphone and a device movement event associated with the smartphone, and
         the closing event includes at least one of a device lock event associated with the smartphone, a device orientation change event associated with the smartphone, and a vehicle trip end event,
      aggregate the one or more phone handling events associated with the smartphone into one or more macro events;
      process the aggregated one or more macro events based on a set of preconfigured rules to determine a phone distraction event, the set of preconfigured rules being based on predefined thresholds to determine the phone distraction event, and
      compute the device movement event associated with the smartphone based on the sensor data received from an accelerometer sensor, including:
         calculating an acceleration norm signal based on the sensor data,
         filtering the acceleration norm signal based on a predefined threshold to detect a plurality of device movement candidates, each of the plurality of device movement candidates being characterized by a start time and an end time,
         merging two or more device movement candidates from amongst the plurality of device movement candidates to generate a merged device movement candidate when a time difference between a start time of a subsequent device movement candidate of the two or more device movement candidates and an end time of a current device movement candidate is less than a predetermined device movement threshold,
         symmetrically enlarging the merged device movement candidate to generate an enlarged merged device movement candidate,
         computing a dispersion index and a quantile for the enlarged merged device movement candidate, and
         determining the device movement event associated with the smartphone based on the dispersion index and the quantile.

2. The system according to claim 1, wherein
   the IoT server is configured to measure a level of phone distraction from the phone distraction event, and
   the measurement is scored using at least one of a binary scoring or a scoring index that measures the level of phone distraction from the phone distraction event.

3. The system according to claim 1, wherein the IoT server is configured to obtain at least one of a device unlock event and a device lock event associated with the smartphone from an operating system of the smartphone through one or more chunks of a data stream.

4. The system according to claim 1, wherein the IoT server is configured to obtain the sensor data from at least one of the accelerometer sensor and a gyroscope sensor located in the smartphone.

5. The system according to claim 4, wherein the IoT server is configured to compute the device orientation change event associated with the smartphone based on the sensor data received from the gyroscope sensor, including:
   computing roll and pitch angles of the smartphone based on the sensor data;
   identifying one or more orientations based on the computed roll and pitch angles and a set of defined configurations; and
   determining the device orientation change event associated with the smartphone based on the identified one or more orientations.

6. A method for detecting phone distraction events in a moving vehicle, the method comprising:
   receiving, by an Internet of Things (IoT) server, sensor data captured by a smartphone located in the moving vehicle using one or more sensors built into the smartphone during a vehicle trip, the sensor data including one or more chunks of data streams associated with an IoT service from the smartphone;
   analyzing, by the IoT server, the sensor data to identify one or more phone handling events associated with the smartphone during the vehicle trip, wherein
      each of the one or more phone handling events is categorized into one of an opening event and a closing event,
      the opening event includes at least one of a device unlock event associated with the smartphone and a device movement event associated with the smartphone, and
      the closing event includes at least one of a device lock event associated with the smartphone, a device orientation change event associated with the smartphone, and a vehicle trip end event;
   aggregating, by the IoT server, the one or more phone handling events associated with the smartphone into one or more macro events;
   processing, by the IoT server, the aggregated one or more macro events based on a set of preconfigured rules to determine a phone distraction event, the set of preconfigured rules being based on predefined thresholds to determine the phone distraction event; and
   computing the device movement event associated with the smartphone based on the sensor data received from an accelerometer sensor, including:
      calculating an acceleration norm signal based on the sensor data,
      filtering the acceleration norm signal based on a predefined threshold to detect a plurality of device movement candidates, each of the plurality of device movement candidates being characterized by a start time and an end time, merging two or more device movement candidates from amongst the plurality of device movement candidates to generate a merged device movement candidate when a time difference between a start time of a subsequent device movement candidate of the two or more device movement candidates and an end time of a current device movement candidate is less than a predetermined device movement threshold, symmetrically enlarging the merged device movement candidate to generate an enlarged merged device movement candidate, computing a dispersion index and a quantile for the enlarged merged device movement candidate, and determining the device movement event associated with the smartphone based on the dispersion index and the quantile.

7. The method according to claim 6, further comprising measuring, by the IoT server, a level of phone distraction from the phone distraction event, wherein the measurement is scored using at least one of a binary scoring or a scoring index that measures the level of phone distraction from the phone distraction event.

8. The method according to claim 6, further comprising obtaining at least one of a device unlock event and a device lock event associated with the smartphone from an operating system of the smartphone through one or more chunks of a data stream.

9. The method according to claim 6, further comprising obtaining the sensor data from at least one of the accelerometer sensor and a gyroscope sensor located in the smartphone.

10. The method according to claim 6, wherein a start time and an end time of the merged device movement candidate are set respectively to the start time of the current device movement candidate and the end time of the subsequent device movement candidate.

11. The method according to claim 9, further comprising computing the device orientation change event associated with the smartphone based on the sensor data received from the gyroscope sensor, including:

computing roll and pitch angles of the smartphone based on the sensor data;

identifying one or more orientations based on the computed roll and pitch angles and a set of defined configurations; and determining the device orientation change event associated with the smartphone based on the identified one or more orientations.

* * * * *